United States Patent
Weiser

(10) Patent No.: US 8,747,995 B2
(45) Date of Patent: *Jun. 10, 2014

(54) PYRAMIDAL FABRICS HAVING MULTI-LOBE FILAMENT YARNS AND METHOD FOR EROSION CONTROL

(75) Inventor: Sidney M. Weiser, Ringgold, GA (US)

(73) Assignee: Propex Operating Company, LLC, Chattanooga, TN (US)

( * ) Notice: Subject to any disclaimer, the term of this patent is extended or adjusted under 35 U.S.C. 154(b) by 188 days.

This patent is subject to a terminal disclaimer.

(21) Appl. No.: 13/267,593

(22) Filed: Oct. 6, 2011

(65) Prior Publication Data
US 2012/0128437 A1 May 24, 2012

Related U.S. Application Data

(63) Continuation of application No. 11/297,022, filed on Dec. 8, 2005, now Pat. No. 8,043,689, which is a continuation-in-part of application No. 11/142,412, filed on Jun. 2, 2005, now abandoned.

(60) Provisional application No. 60/584,881, filed on Jun. 29, 2004.

(51) Int. Cl.
*D03D 3/08* (2006.01)

(52) U.S. Cl.
USPC ........... 428/175; 428/180; 428/183; 428/397; 442/196; 442/335; 28/163; 405/15; 405/258.1

(58) Field of Classification Search
USPC .......... 428/175, 180, 183, 397; 442/196, 335; 28/163; 405/15, 258.1
See application file for complete search history.

(56) References Cited

U.S. PATENT DOCUMENTS

| | | |
|---|---|---|
| 2,627,644 A | 2/1953 | Foster |
| 2,635,648 A | 4/1953 | Foster |
| 2,757,434 A | 8/1956 | McCord |
| 2,771,661 A | 11/1956 | Foster |
| 3,914,488 A | 10/1975 | Gorrafa |
| 3,934,421 A | 1/1976 | Daimler et al. |
| 4,002,034 A | 1/1977 | Muhring et al. |

(Continued)

FOREIGN PATENT DOCUMENTS

| | | |
|---|---|---|
| AR | 058267 | 1/2008 |
| JP | 7290627 A2 | 11/1995 |
| MX | PA/A/2005/007084 | 4/2007 |
| WO | WO 2007/067833 A2 | 6/2007 |

OTHER PUBLICATIONS

International Search Report related to PCT/US2006/060445.

*Primary Examiner* — Elizabeth Cole

(74) *Attorney, Agent, or Firm* — Laura A. Labeots; Husch Blackwell LLP

(57) ABSTRACT

A pyramidal geotextile fabric comprising two sets of multi-lobe filament yarns interwoven in substantially perpendicular direction to each other, each of the multi-lobe filament yarns having pre-determined, different heat shrinkage characteristics such that, upon heating, the fabric forms a three-dimensional, cuspated profile. A method of stabilizing soil and reinforcing vegetation comprises the steps of placing a three-dimensional, high-profile woven fabric into soil, wherein the fabric comprises two sets of multi-lobe filament yarns interwoven in substantially perpendicular direction to each other, each of the multi-lobe filament yarns having pre-determined, different heat shrinkage characteristics such that, upon heating, the fabric forms a three-dimensional, cuspated profile; securing the fabric to the ground; and, distributing soil and seed onto the fabric such that the section of ground is quickly revegetated and thereby protected from further erosion.

29 Claims, 4 Drawing Sheets

(56) References Cited

U.S. PATENT DOCUMENTS

| | | |
|---|---|---|
| 4,002,596 A | 1/1977 | Murch |
| 4,181,450 A | 1/1980 | Rasen et al. |
| 4,252,590 A | 2/1981 | Rasen et al. |
| 4,329,392 A | 5/1982 | Bronner |
| 4,421,439 A | 12/1983 | ter Burg et al. |
| 4,472,086 A | 9/1984 | Leach |
| 4,762,581 A | 8/1988 | Stancliffe et al. |
| 4,950,531 A | 8/1990 | Radwanski et al. |
| 5,007,766 A | 4/1991 | Freed et al. |
| 5,182,162 A | 1/1993 | Andrusko |
| 5,224,292 A | 7/1993 | Anton |
| 5,255,998 A | 10/1993 | Beretta |
| 5,326,192 A | 7/1994 | Freed |
| 5,419,659 A | 5/1995 | Mercer |
| 5,431,991 A | 7/1995 | Quantrille et al. |
| 5,567,087 A | 10/1996 | Theisen |
| 5,591,523 A | 1/1997 | Aneja |
| 5,616,399 A | 4/1997 | Theisen |
| 5,626,961 A | 5/1997 | Aneja |
| 5,651,641 A | 7/1997 | Stephens et al. |
| 5,736,243 A | 4/1998 | Aneja |
| 5,817,740 A | 10/1998 | Anderson |
| 5,849,645 A | 12/1998 | Lancaster |
| 5,851,089 A | 12/1998 | Beretta |
| 5,951,202 A | 9/1999 | Brown |
| 5,972,463 A | 10/1999 | Martin et al. |
| 5,972,505 A | 10/1999 | Phillips et al. |
| 6,093,491 A | 7/2000 | Dugan et al. |
| 6,139,955 A | 10/2000 | Girgis |
| 6,171,984 B1 | 1/2001 | Paulson et al. |
| 6,343,895 B1 | 2/2002 | Yanada et al. |
| 6,509,285 B1 | 1/2003 | Yeh |
| 6,855,650 B1 | 2/2005 | Bohannon, Jr. |
| 8,043,689 B2 | 10/2011 | Weiser |

PYRAMIDAL FABRICS HAVING MULTI-LOBE FILAMENT YARNS AND METHOD FOR EROSION CONTROL

CROSS-REFERENCE TO RELATED APPLICATION

This application is a continuation of application Ser. No. 11/297,022, filed Dec. 8, 2005 now U.S. Pat. No. 8,043,689, which is a continuation-in-part of U.S. Ser. No. 11/142,412, filed Jun. 2, 2005, now abandoned, which claims the benefit of U.S. provisional application, U.S. Ser. No. 60/584,881, filed Jun. 29, 2004, whose disclosures are incorporated herein by reference.

BACKGROUND OF THE INVENTION

This invention relates generally to three-dimensional, high-profile, woven geotextile structures and their method for use in soil retention and stabilization and vegetative reinforcement. More particularly, this invention relates to a generally planar, single-layered homogeneous fabric woven from cross-sectional multi-lobe filament yarns having different heat shrinkage characteristics such that, when heated, the fabric forms a thick three-dimensional, cuspated profile. The multi-lobe filament yarns have a relatively high tensile strength and a relatively high modulus at 10 percent elongation so as to provide a fabric which is greater in strength and more dimensionally stable than other three-dimensional, woven geotextile structures. Such a geotextile fabric is suitable for use on slopes, ditches and other embankments and surfaces where erosion control, soil stabilization and/or vegetative reinforcement may be necessary. The homogeneous, single-component nature of the fabric promotes easier handling and minimizes failure points, while offering a thick, strong and dimensionally stable product upon installation.

Known geotextile products having been used for erosion protection and control include pyramidal fabrics and turf reinforcement mats (TRM's). The latter are typically fabricated in one of the following three ways: (1) polymer monofilament or natural organic fibers are stitch bonded together; (2) polymer monofilament can be fused with netting or (3) polymer monofilaments are woven into erosion control structures. The former include high profile, woven geotextile fabrics.

Woven fabrics having heat-shrinkable yarns incorporated therein are well known. For example, at least three patents to B. H. Foster in the early 1950's (U.S. Pat. Nos. 2,627,644, 2,635,648, and 2,771,661) and one to McCord in 1956 (U.S. Pat. No. 2,757,434) use heat-shrinkable yarns along with non-heat-shrinkable yarns to make honeycombed, puffed and/or corrugated fabrics for use in bedding, clothing and the like.

In addition, woven fabrics having the same or similar general cuspated profile or "honeycomb" type weave configuration as the present invention are known in the art and are used as tower packing and/or as the separation medium in mist eliminators. For instance, Pedersen U.S. Pat. No. 4,002,596 relates to a fluid treating medium through which fluid may pass for removing particulate material from the fluid. The material used is comprised of at least two sets of strands interleaved together in a particular configuration to each other so that the strands extending in one direction are generally straight while the strands extending in another direction are geometrically arranged so as to provide a fabric having a cuspated configuration or profile. The fabric of the present invention is similar in profile except it may bend the strands of yarn in both directions.

Also of major importance to the use of fabrics in soil design and performance are weight, strength, and modulus. It is a combination of these properties, including thickness, which determines whether a geotextile fabric will be suitable for use in soil retention and stabilization as well as turf reinforcement. Desirably, a fabric having a typical tensile strength of at least about 4000×3000 pounds per foot (warp×fill, respectively) as determined by the American Society for Testing and Materials (ASTM) Standard Test Method D6818, a modulus of at least about 10000 pounds per foot determined by ASTM D6818 at 10 percent elongation, is necessary to provide soil stabilization and erosion control on slopes, embankments, subgrades and veneer layers in places such as landfills. While some mattings and other similar structures have, heretofore, been used to aid in soil retention or erosion control, most of these structures have been generally ineffective in providing true stability and reinforcement for the soil. In fact, most of the prior art structures have employed generally straight yarns in at least one direction, are not heat-shrinkable, and/or have filaments which are melt-bonded together so as to cause failure points to exist with respect to the bonding of the fabric.

For example, Daimler et al. U.S. Pat. No. 3,934,421 discloses a matting comprising a plurality of continuous amorphous synthetic thermoplastic filaments which are bonded together at their intersections and can be used for the ground stabilization of road beds.

Murhling et al. U.S. Pat. No. 4,002,034 is directed toward a multi-layered matting for inhibiting the erosion of an embankment around a body of water, the layer closest to the water having less pore space and thinner fibers than the layers away from the water.

Bronner U.S. Pat. No. 4,329,392 discloses a hydraulic engineering matting for inhibiting rearrangement of soil particles comprising a layer of melt-spun synthetic polymer filaments bonded at their points of intersection, a filter layer of fine fibers bonded thereto, and a third layer interdispersed therethrough.

Ter Burg et al. U.S. Pat. No. 4,421,439 discloses a supporting fabric or matting for use on embankments of roads, dikes, and the like. The fabric generally includes straight yarns in both the warp and weft directions with binder yarns extending in the warp direction and woven around the straight yarns of the weft direction. However, these yarns do not impart strength to the straight yarns.

Leach U.S. Pat. No. 4,472,086 is directed toward a geotextile fabric for erosion control having, uncrimped synthetic threads in both the warp and filling directions and a known yarn stitch bonding the warp and filling threads together.

Finally, a commercially known high-profile structure generally used for soil retention and erosion control which does employ heat-shrinkable yarns, but not in a single layer, is disclosed in Stancliffe et al. U.S. Pat. No. 4,762,581. This patent relates to high-profile structures or composites which are noted to be useful as carpet underlay and mattresses as well as embankment stabilization and drainage. These structures are believed to be commercially sold under the trade name, Tensar, and are available from Netlon Limited of Mill Hill, England.

However, the structures in Stancliffe et al. are provided by the welding of a planar, biaxially heat-shrinkable, plastic mesh layer to a planar, relatively non-heat-shrinkable plastic mesh layer at zones which are spaced apart on a generally square grid. Hence, when the heat-shrinkable layer is heated and shrinks, the non-heat-shrinkable layer assumes a generally cuspated configuration with the welded points on the non-heat-shrinkable layer remaining in contact with the heat-shrinkable layer. This patent does not provide a single layer fabric and is susceptible to failure at the welding points bonding the layers together.

Another pyramidal fabric is described in U.S. Pat. Nos. 5,567,087 and 5,616,399, owned by the Assignee of record. The fabrics taught in those patents are woven from round, monofilament yarns and a description of such fabrics and their manufacture is set forth in the aforementioned patents, the subject matter of which is incorporated by reference herein.

Thus, while attempts have been made heretofore to provide a suitable means for stabilizing and retaining soil and for reinforcing turf, the art heretofore has not taught variations to pyramidal fabrics which provide improved revegetation, erosion protection and water quality on slopes and in channels.

BRIEF SUMMARY OF THE INVENTION

It is therefore; an aspect of the present invention to provide a pyramidal fabric which promotes improved revegetation, provides erosion protection and improved, water quality on slopes.

It is another aspect of the present invention to provide a pyramidal fabric woven from a multi-lobe filament yarn, providing an increase in surface area.

It is yet another aspect of the present invention to provide a method for erosion control and revegetation facilitation employing the pyramidal fabric of the present invention.

At least one or more of the foregoing aspects, together with the advantages thereof over the known art relating to pyramidal fabrics, which shall become apparent from the specification which follows, are accomplished by the invention as hereinafter described and claimed.

In general, the present invention provides a pyramidal fabric comprising two sets of multi-lobe filament yarns interwoven in substantially perpendicular direction to each other, each of the multi-lobe filament yarns having pre-determined, different heat shrinkage characteristics such that, upon heating, the fabric forms a three-dimensional, cuspated profile.

The present invention also includes a method of stabilizing soil and reinforcing vegetation comprising the steps of placing a three-dimensional, high-profile woven fabric into soil, wherein the fabric comprises two sets of multi-lobed filament yarns interwoven in substantially perpendicular direction to each other, each of the multi-lobe filament yarns having pre-determined, different heat shrinkage characteristics such that, upon heating, the fabric forms a three-dimensional, cuspated profile; securing the fabric to the ground; and, distributing soil and seed onto the fabric such that the section of ground is quickly revegetated and thereby protected from further erosion.

DETAILED DESCRIPTION OF THE INVENTION

The present invention is directed toward geotextile fabrics, as set forth in U.S. Pat. Nos. 5,567,087 and 5,616,399, noted hereinabove. The difference between the fabrics described in the patents and the present invention is that while the former employed round, monofilaments to weave the fabric, the fabrics of the present invention are woven from multi-lobe filament yarns and are referred to herein as pyramidal fabrics. Such fabrics are used to prevent erosion of exposed surfaces and to facilitate the revegetation of a previously eroded surface.

Figure 2:
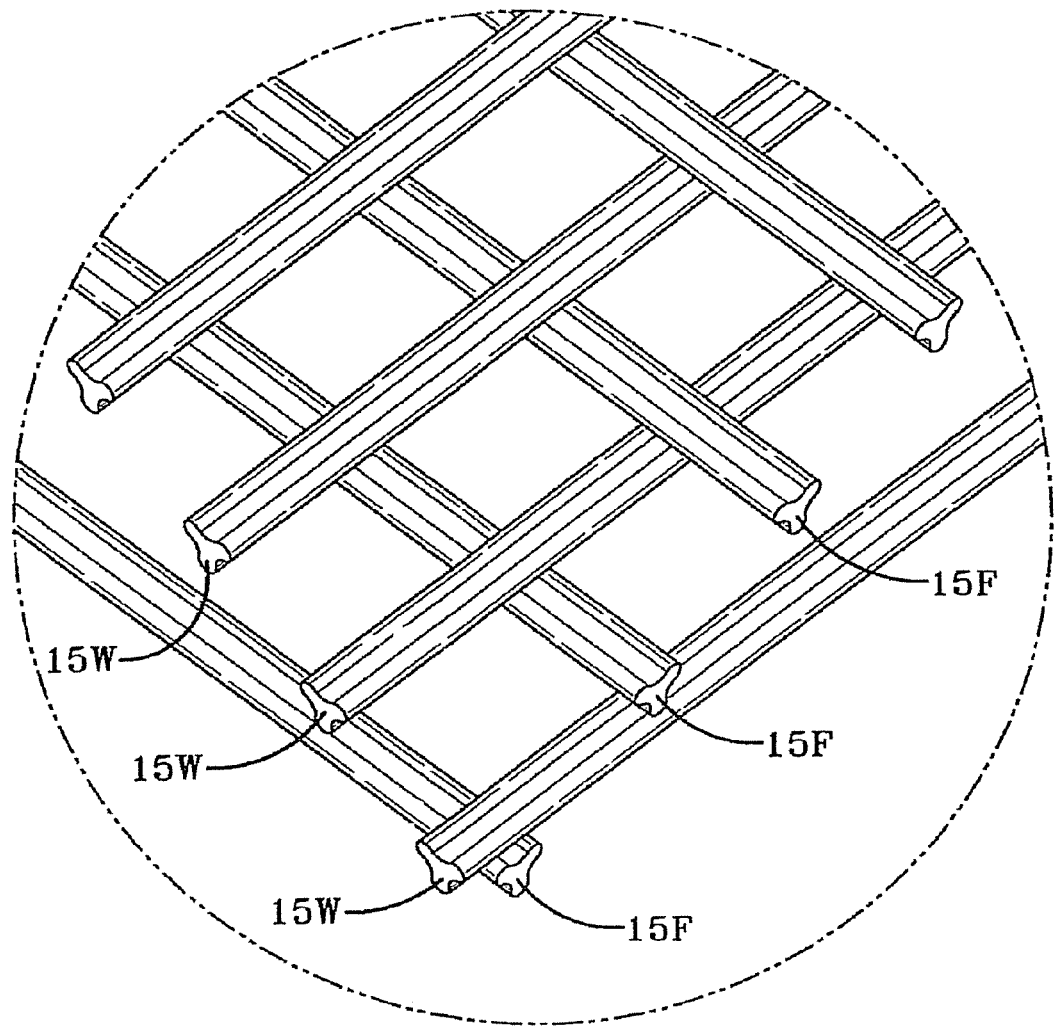
FIG. 2 is an enlarged section of FIG. 1.
Figure 3:
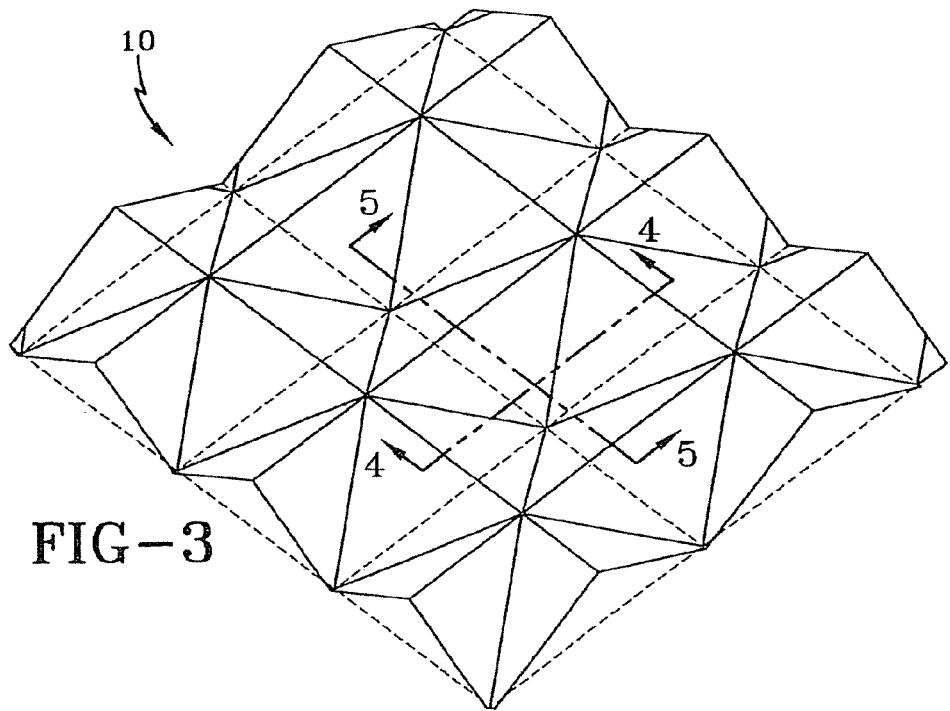
FIG. 3 is a schematic view of the pyramidal fabric of FIG. 1, showing its general configuration.

A geotextile fabric embodying the concepts of the present invention is generally indicated by the numeral 10 in the accompanying drawings and includes two sets of filaments 15W (warp direction) and 15F (fill direction) interwoven in substantially perpendicular directions to each other. As best shown in FIG. 2, the fibers or filament yarns are initially, woven into a type of pattern known in the weaving art as a "waffle weave" or "honeycomb" type of woven pattern. This weaving procedure, which is well known in the art and can be performed on essentially any conventional textile weaving apparatus, produces a generally planar, single layer fabric with a distinctive look of adjacent pyramids on one side of the fabric which oppose and are offset from adjacent pyramids on the other side of the fabric.

Figure 1:
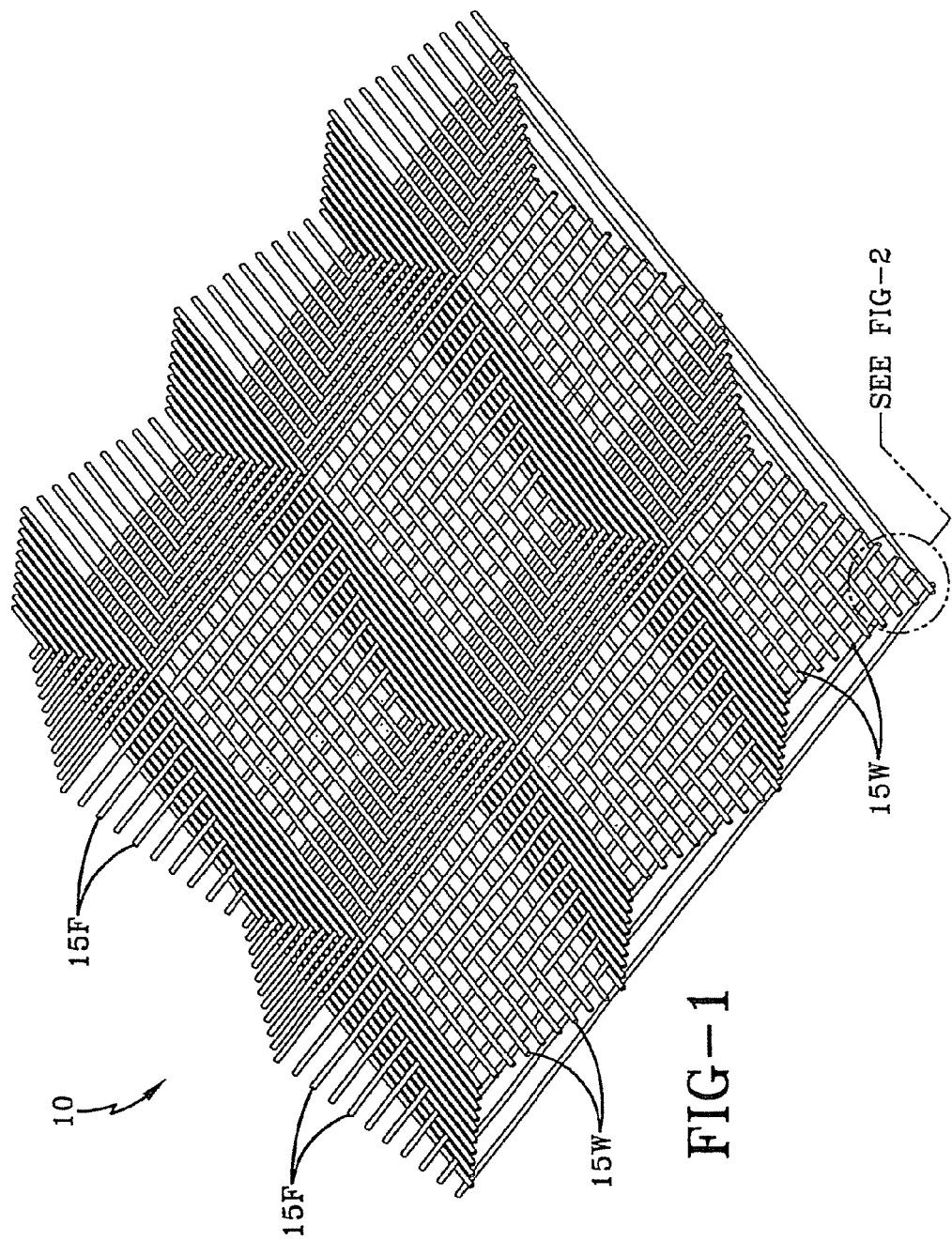
FIG. 1 is a perspective view depicting a pyramidal fabric, according to the present invention.
Figure 4:
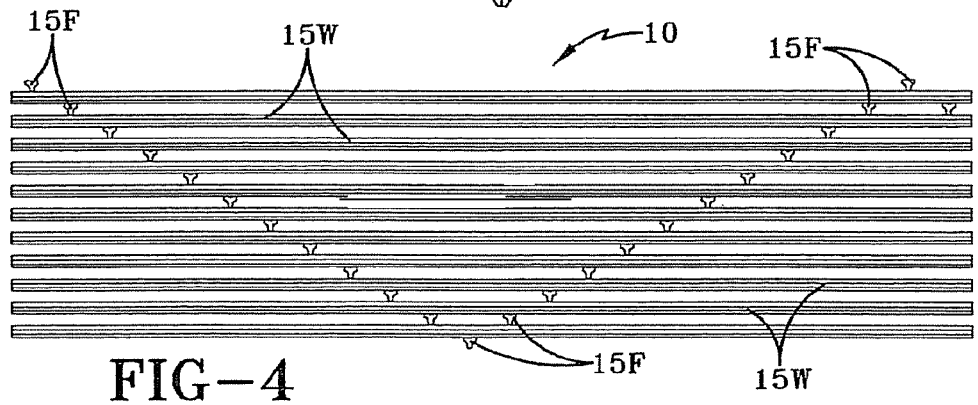
FIG. 4 is an enlarged sectional view taken substantially along line 4-4 in FIG. 3.
Figure 5:
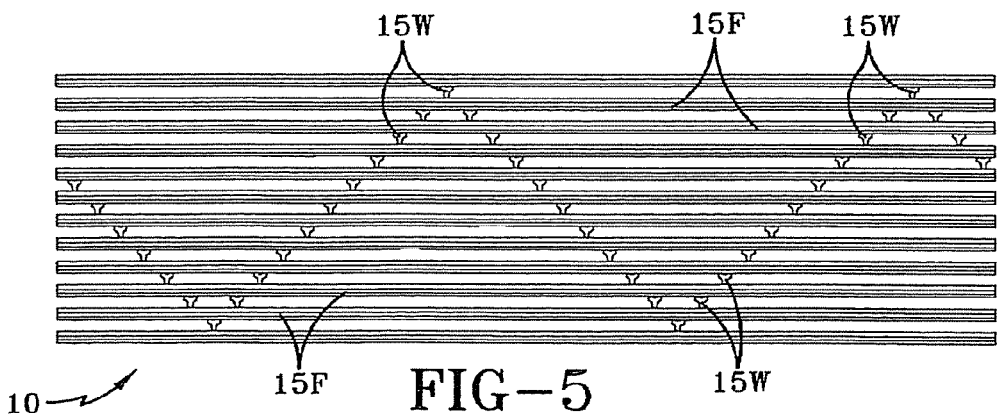
FIG. 5 is an enlarged sectional view taken substantially along line 5-5 in FIG. 3.

Importantly, the filament yarns utilized to produce the geotextile fabric of the present invention are biaxially heat shrinkable. That is, upon being heated, the filament yarns will shrink in both directions. However, the amount of heat shrinkage is different for each filament yarn depending upon its position within the woven fabric. Hence, when the woven, initially planar fabric 10 is subjected to heat, as from a hot steam or water bath, the filaments 15W and 15F are shrunk proportionally to the differing levels of heat shrinkage with which each filament was provided. Significantly, by arranging the filaments in a predetermined, well-known fashion based upon their level of heat shrinkage, the initially planar geotextile fabric 10 becomes thicker and more three-dimensional in shape. As seen in FIGS. 4 and 5, the filaments provide a zig-zag cross-section and take up a substantially greater volume than when the fabric is relatively planar. Consequently, a three-dimensional, high-profile woven geotextile fabric is formed as shown in FIG. 1.

Moreover, the distinctive look of the fabric becomes more pronounced. That is, the pyramidal shapes within the fabric become significantly deeper and more defined. In one embodiment, the thickness of the geotextile fabric should grow to at least about 0.25 inches (250 mils). It is this thickness as well as other characteristics of this fabric which permit its use for soil retention and turf reinforcement. More generally, the thickness of the fabric can grow from about 0.25 inches (250 mils) to about 0.5 inches (500 mils).

For instance, in one embodiment, the fabric of the present invention can have a tensile strength of at least about 1800 pounds/foot in the warp direction and at least about 1800 pounds/foot in the filling direction using the American Society for Testing and Materials (ASTM) Standard Test Method D-6818. In another embodiment, the fabric of the present invention can have a tensile strength of at least about 4900 pounds/foot in the warp direction and at least about 3600 pounds/foot in the filling direction using the same ASTM Test Method, D-6818. In yet another embodiment, the fabric has a tensile strength of at least about 4700 pounds/foot in the warp direction and at least about 3500 pounds/foot in the filling direction, again using ASTM Standard Test Method D-6818.

The fabric can have a modulus at 10% elongation of at least about 9,000 pounds/foot in the warp direction and at least about 9,000 pounds/foot in the filling direction using the same ASTM Test Method, D-6818. In another embodiment, the fabric can have a modulus at 10% elongation of at least about 12,500 pounds/foot in the warp direction and at least about 11,000 pounds/foot in the filling direction. In yet another embodiment, the fabric can have a modulus at 10% elongation of at least about 18,500 pounds/foot in the warp direction and at least about 16,000 pounds/foot in the filling direction using the same ASTM Test Method, D-6818.

At this point, it should be noted that the filaments utilized in the geotextile fabric of the present invention are thermoplastic cross-sectional multi-lobe filament yarns comprising such materials as polyethylene and polypropylene homopolymers, polyesters, polyphenylene oxide, certain fluoropolymers, and mixtures thereof. However, it will be understood that any materials capable of producing filaments or fibers suitable for use in the instant fabric of the present invention fall within the scope of the present invention and can be determined without departing from the spirit thereof. In one embodiment, the filaments of the present invention are made of polypropylene, polyethylene, high tenacity polyester, or mixtures thereof.

Moreover, before more specifically detailing the operation of the present invention, it should be understood that the process for making the geotextile fabric is well known in the art. As noted hereinabove, the weaving process can be performed on any conventional textile handling equipment suitable for producing the fabric of the present invention and thus, a "honeycomb" type weave produced from thermoplastic polymeric yarns is also well-known in the art.

However, it should be understood that no single-layered, homogeneous fabric has been employed for the purposes of the present invention. Importantly, because of the increased thickness of the fabric provided by the shrinkage of the pre-arranged filaments employed therein when subjected to heat, the subject invention can be utilized in erosion control and veneer cover soil and stability applications.

Figure 6:
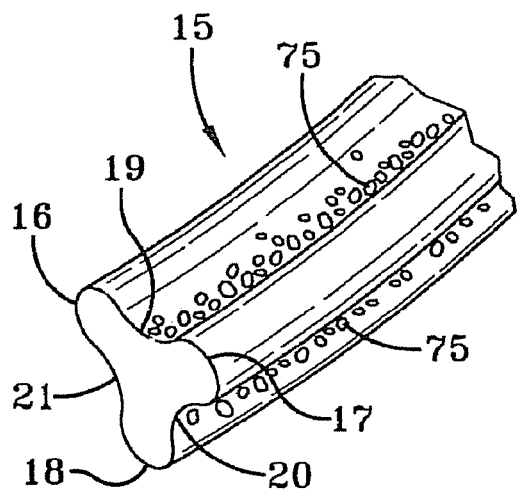
FIG. 6 is a perspective view of a portion of a multi-lobe filament yarn, forming the pyramidal fabrics of the present invention.
Figure 7:
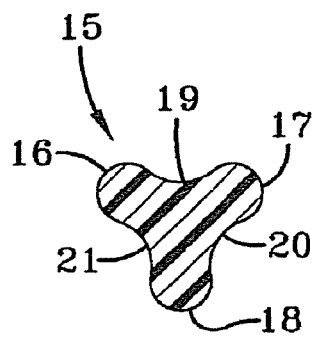
FIG. 7 is a cross-sectional view of the multi-lobe filament yarn of FIG. 6.
Figure 8:
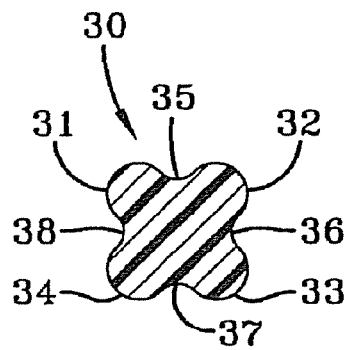
FIGS. 8-10 are cross-sectional views of alternative multi-lobe filament yarns, that can be employed to form the pyramidal fabrics of the present invention.
Figure 9:
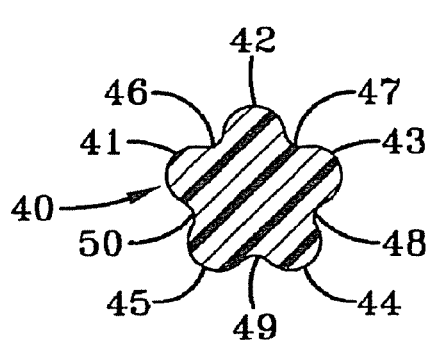
Figure 10:
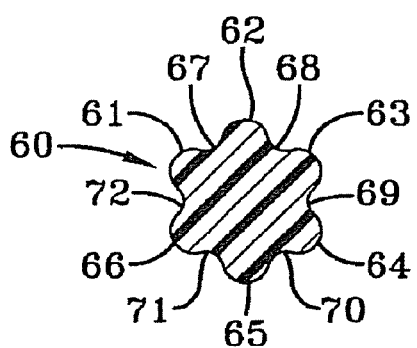

Current fibers used in the construction of pyramidal fabrics are round or oval in shape. The filament yarns 15W and 15F of the pyramidal fabric 10 of the present invention consist of multi-lobe filament yarns, indicated generally by the numeral 15 in FIG. 6. The fiber 15 is characterized herein as multipoint, multi-lobe or multi-dimensional and as depicted in FIG. 7, provides three separate points or edges, 16, 17 and 18 and three grooves or channels 19, 20 and 21, between the points. Due to the geometric orientation of the fiber there is an increase in surface area with grooves/channels along the yarn 15. The filament yarns 15 provide a minimum of three points but are not limited to three when viewing a cross-section of the fiber. With reference to FIGS. 8-10 for instance, alternative filament yarns 30, 40 and 60, respectively are depicted. Fiber 30 provides four edges or points, 31-34 and four channels, 35-38. Fiber 40 provides five edges or points, 41-45 and five channels, 46-51. Fiber 60 provides six edges or points, 61-66 and six channels, 67-72. For purposes of discussion herein, reference shall be made to the fiber 15, with the understanding that it is representative of a fiber having a multipoint, geometric shape and that practice of the present invention is not limited to the specific form of fiber having three edges and three channels.

The fiber 15 is extruded via a die that forms the multipoint geometric shape. This shape is made in the extrusion process of the fiber. The unique geometric orientation-multipoint cross-section of the fiber captures sediment 75, (FIG. 6) and water, which assist in greater vegetation establishment. The sediment and moisture is captured in the grooves/channels (16/19 etc.) of the fiber, which enhances seed germination and root establishment. The fiber allows for greater degree of crimp amplitude due to the geometric orientation of the fiber. Resiliency data showed a 10 percent increase over the standard round or oval monofilament. Increased loft for ease of plant growth is essential in a pyramidal fabrics functionality. The pyramidal fabric of the present invention 10, revealed seed germination improvements of up to 1488 percent over the standard and commonly used monofilament fiber pyramidal fabric when tested in an independent third party lab. In bench-scale shear testing, a partial vegetated plot using the pyramidal fabric 10 revealed at least a 30 percent reduction in soil loss, as compared to a pyramidal fabric woven from monofilaments.

The fiber 15 is polymer based, such as polyolefins, polyesters, polyamides, and blends thereof, with polypropylene being preferred. The fiber is extruded through a die that forms the unique multidimensional shape, at temperatures in excess of 380.degree. to 440° F., (193° to 227° C.), which provides the multipoint cross-sectional fiber. The fiber is extruded through a water quench bath at temperatures of 70° C. The fiber is then pulled through several blowers and dryers to remove the excess water from the channels of the fiber. The fiber is then drawn into the oven at temperatures of 280+−15° C. and draw ratio of 6.0/1 to 8.0/1.

Each fiber is one continuous strand (minimum of 160 holes per die) which is wound up on a winder to form a package or spool. Deniers of the fiber 15 range from about 300 (333 decitex) to about 2000 (2222 decitex) with from about 500 (555 decitex) to about 1100 (1222 decitex) being preferred, irrespective of the actual cross-sectional geometry. It is to be appreciated that the drawings depict an idealized multipoint cross-section for the fibers, where each edge or lobe, e.g., 16, 17, 18, and channel e.g., 19, 20 and 21, is uniform. In reality, the edges and channels are not symmetrical or sharply defined, as a result of quenching; however, the filament yarns do have distinct edges and channels, so as to provide a multi-dimensional geometry.

Specific embodiments of the present invention involve methods for preventing erosion control or promotion of revegetation of a barren or previously eroded area, or both. It is believed that the increased surface area of the multi-lobe filament yarns of the present invention provide a great surface area on which runoff water can drain without damaging, i.e., eroding, the underlying soil. Further, the irregularly shaped voids of the present pyramidal fabric provide ample space into which sediment, soil and seed, if any, can fall, thereby holding down the fabric as well as facilitating its incorporation into/onto the surface to be protected.

For example, the present invention includes a method of stabilizing soil and reinforcing vegetation comprising the step of placing a three-dimensional, high-profile woven fabric into soil, wherein the fabric comprises two sets of multi-lobe filament yarns interwoven in substantially perpendicular direction to each other, each of the multi-lobe filament yarns having pre-determined, different heat shrinkage characteristics such that, upon heating, the fabric forms a three-dimensional, cuspated profile; securing the fabric to the ground;

and, distributing soil and seed onto the fabric such that the section of ground is quickly revegetated and thereby protected from further erosion.

The fabric can be secured to the ground by U-shaped wire staples or metal Geotextile pins. Wire staples should be a minimum thickness of 8 gauge (4.3 mm). Metal pins should be at least 3/16 in (4.7 mm) diameter steel with a 1.5 in (38 mm) steel washer at the head of the pin. Wire staples and metal pins should be driven flush to the soil surface. Depending on slope the number of staples or pins range from 1 to 3 per square yard. Prior to installing one must grade and compact the area of installation and remove rocks, clods, vegetation or other obstructions so that the installed mat will have direct contact with soil surface. Prepare seedbed by loosening 2 to 3 inches (50-75 mm) of topsoil above final grade. Incorporate amendments such as lime and fertilizer into soil if needed. Seed are applied to the soil surface before installing mat or after installation.

A series of performance-related index tests have been developed by the Erosion Control Technology Council (ECTC) to make rolled erosion control product (RECP) testing more cost-effective and time-efficient. Using the turf reinforcement mats of the present invention as RECP's, these testing methods were employed for RECP characterization tests which demonstrates efficacy of the invention. First, a brief background on RECP characterization, is provided as follows.

Soil Loss and The Soil Loss Ratio. When used on slopes, the primary consideration of RECP systems is their ability to reduce soil loss caused by raid and immediate runoff. Soil loss, ratio is equal to the reduction in soil loss when using a specific RECP system compared to the comparable bare soil (control) condition.

Permissible Shear Design. Flowing water in channels imposes shear stress on the sides and bottom of the channel. In the permissible shear stress of an RECP used to line the channel is greater than the imposed shear, the lining is considered to provide acceptable erosion resistance.

Mulching and RECP Longevity. RECPs often are used to provide short-term mulching, along with erosion protection, aimed at nurturing vegetation growth. As a result, there is a need to evaluate the effectiveness of an RECP in nurturing initial seed germination. Additionally, vegetation may require varying times to develop sufficiently to provide significant erosion protective cover. Times may range from 6 weeks in, humid environments to several years in and conditions. Some RECPs are required to provide permanent turf reinforcement. In all cases the RECP must be shown to have the appropriate longevity.

Testing Approach

ECTC's Slope Erosion Test. The ECTC test method titled, "Standard Index Test Method for the Determination of Unvegetated Rolled Erosion Control Product (RECP) Ability to Protect Soil from Rain Splash and Associated Runoff Under Bench-Scale Conditions" establishes the procedures for evaluating the ability of Rolled Erosion Control Products (RECPs) to protect soils from rain splash and immediate runoff-induced erosion. The critical element of protection measured is the ability of the RECP to absorb the impact force of raindrops, thereby reducing soil particle loosening through "splash" mechanisms. The test method utilizes a laboratory-scale testing apparatus, rather than full-scale field simulation.

ECTC's Channel Erosion Test. The ECTC test method titled, "Standard Index Test Method for Determination of Unvegetated Rolled Erosion Control Product (RECP) Ability to Protect Soil from Hydraulically-Induced Shear Stresses Under Bench-Scale Conditions" establishes the procedures for evaluating the ability of Rolled Erosion Control Products (RECPs) to protect soils from flow-induced erosion. The test method utilizes a laboratory-scale testing apparatus, rather than full-scale field simulation.

ECTC's Mulching Test. The test method titled, "Standard Index Test Method for Determination of Temporary Degradable Rolled Erosion Control Product (RECP) Performance in Encouraging Seed Germination and Plant Growth" establishes the procedures for evaluating the ability of RECP's to encourage seed germination and initial plant growth. The results of the test can be used to compare RECPs and other erosion control methods to determine which are the most effective at encouraging the growth of vegetation in different climates.

Summary of Test Results

The following ASTM tests were conducted using Samples A and B. Sample A was an existing pyramidal fabric, employing round monofilament fibers for the non-woven mat. Sample B was a pyramidal fabric of the present invention, employing multi-lobe filament yarns. For a control, no pyramidal fabric was employed over the soil. Each test provides a physical property e.g. tensile strength, first for an A sample, followed by a B sample. Tests results have been reported in Tables I through III. Tensile testing, reported in Table I, was conducted according to ASTM D 6818 and resiliency was conducted according to ASTM D 6524. Germination testing was reported in Table II and Bench-Scale shear testing was reported in Table III.

The Bench-Scale shear testing employs the following apparatus and procedures. 8 inch (20.3 cm) diameter, 4 inch (10.2 cm) deep pots containing RECP-protected soil are immersed in water, and the surface is subjected to shear stresses caused by the rotation of an impeller for 30 minutes. The shear stress test apparatus includes a tank, an internal "table" to hold recessed pots, and an impeller. The impeller is mounted in the cylindrical tank so that the lower edge of the blades is slightly above the surface of the pots. The internal table has openings that hold the pots of soil. When pots are placed in the table openings, the test surface is flush with the top of the table. The amount of soil that erodes is found from weighing the containers of saturated soil both before and after testing. Tests are commonly run at multiple (at least three) shear stress levels. From this data the shear stress associated with a critical amount of soil loss (typically 0.5 in (1.25 cm)) can be calculated. The critical shear stress is sometimes referred to as the "permissible shear stress" of the RECP.

Shear, where X=Shear stress (lb/ft2), is calculated using the following data:
y=Unit weight of water (lb/ft3)
y=Flow depth (ft)
2f=Angle of energy grade line (degrees)
x=y*y^*2f.

TABLE I

Comparative Evaluation of Pyramidal Fabrics
Current Specification

| Property | Me | Units | MARV$^a$ | Fabric A | Fabric B | % difference to Std Data |
|---|---|---|---|---|---|---|
| Thickness | MD | mils | 500 | 409 | 393 | −4% |
| Mass Per Unit Area | MD | oz/yd$^2$ | 14 | 15.11 | 13.69 | −9% |
| Resiliency | MD | % change | −20 | −7.1 | −11.3 | 59% |
| Flexibility | MD | mg-cm | N/A | 726532 | 610969 | −16% |
| Tensile | MD | lb/ft | 3200 | 4752 | 4560 | −4% |

TABLE I-continued

Comparative Evaluation of Pyramidal Fabrics
Current Specification

| Property | Me | Units | MARV$^a$ | Fabric A | Fabric B | % difference to Std Data |
|---|---|---|---|---|---|---|
| Strength-MD | | | | | | |
| Tensile Strength-XMD | | lb/ft | 2200 | 3192 | 3468 | 9% |
| Tensile Elongation-MD | MD | % | 65 (MAX) | 42 | 50.7 | 21% |
| Tensile Elongation-XMD | | % | 65 (MAX) | 38.7 | 36 | −7% |
| Light Penetration MD | | % | 25 | 13.5 | 6.6 | −51% |
| Ground Cover | | % | 75 | 86.5 | 93.4 | 8% |

$^a$Minimum average roll value

TABLE II

Germination Testing

| Property | Units | day | control | Fabric A | Fabric B | % difference to Std Data |
|---|---|---|---|---|---|---|
| Seeds Germinated per area | # per 4 in$^2$ area | 0 | 0 | 0 | 0 | n/a |
| | | 7 | 0 | 0 | 0 | n/a |
| | | 14 | 2.6 | 0 | 4.4 | n/a |
| | | 21 | 8.2 | 0.8 | 12.7 | 1488% |
| Average Plant Height | inch | 0 | 0 | 0 | 0 | n/a |
| | | 7 | 0 | 0 | 0 | n/a |
| | | 14 | 1.4 | 0 | 1.4 | n/a |
| | | 21 | 1.6 | 1 | 1.5 | 50% |
| Plant mass per area | mg per 4 in$^2$ | 21 | 3.9 | 1 | 8.6 | 760% |

With reference to the data, after 21 days, the Sample B product showed a 1488% improvement over the Sample A product for seed germinated per area. For average plant height, the improvement of Sample B over Sample A was 50% and for plant mass per area, the improvement of Sample B over Sample A was 760%. Generally, using the fabrics according to the present invention, seed germinated per area provides at least a 50% improvement over fabrics made with round monofilaments; likewise for average plant height, the improvement is from about 30% to about 50% for fabrics of the present invention, respectively and, for plant mass per area, the improvement is from about 350% to about 760% for two fabrics of the present invention.

TABLE III

Bench-Scale Shear Testing

| psf | Fabric A | Fabric B | % difference to Std Data |
|---|---|---|---|
| 3.87 | 413 | 288 | −30% |
| 4.72 | 590 | 370 | −37% |
| 5.57 | 683 | 432 | −37% |

In Table III, the water flow is designated as pounds per square foot (psf), in the first column. Soil lost by washing, measured in grams, is listed for Fabrics A and B in the next two columns. By interpolation from the lab scale testing, a loss of 450 grams of soil is equivalent to one-half inch (1.25 cm) in the field and is unacceptable. The results of Table III indicate that Sample B had 30% less soil loss than Sample A at 3.87 psf and 4.72 psf and 37% less soil loss than Sample A at 5.57 psf. In no instance did Fabric B lose 450 grams of soil.

Using the fabrics of the present invention, soil losses can be reduced by at least about 30%, compared to pyramidal fabrics constructed of round monofilaments.

Pyramidal fabric of the present invention (Sample B) was also evaluated against traditional round monofilament yarn pyramidal fabric (Sample A) in vegetation tests, as reported in Table IV.

TABLE IV

Pyramidal Fabric Tested with Standard Kentucky Bluegrass Vegetation

| | Unit of Measure | Traditional Round | Multi-Lobe | Performance Improvement of |
|---|---|---|---|---|
| Shear Stress | Lb/ft$^2$ | 10.1 | 13.3 | 32% |
| Velocity | Ft./sec. | 15 | 17.9 | 19% |

| | Unit of Measure | Traditional Round | Multi-Lobe | Decrease Growing Time |
|---|---|---|---|---|
| Planted | | June 1999 | June 2004 | |
| Tested | | June 2000 | Mid-September 2004 | |
| Duration | Months | 12 | 3.5 | −71% |

With reference to Table IV, it can be seen shear stress and velocity were both improved for the pyramidal fabrics of the present invention. Additionally, growing time was decreased significantly by the use of the pyramidal fabrics of the present invention. Using the pyramidal fabrics of the present invention, decreased growing times of at least about 50% can be obtained as compared to pyramidal fabrics made from traditional round yarns.

Thus, it should be evident that the pyramidal fabrics and method of the present invention are highly effective in preventing erosion from exposed surfaces and promoting revegetation of previously eroded surfaces. The invention is particularly suited for erosion control and promotion of revegetation of a previously eroded land surface, but is necessarily limited thereto.

Based upon the foregoing disclosure, it should now be apparent that the use of the pyramidal fabrics described herein will carry out the objects set forth hereinabove. It is, therefore, to be understood that any variations evident fall within the scope of the claimed invention and thus, the selection of specific component elements can be determined without departing from the spirit of the invention herein disclosed and described. In particular, multi-lobe filament yarns according to the present invention are not necessarily limited to those having a tri-lobal cross section. Thus, the scope of the invention shall include all modifications and variations that may fall within the scope of the attached claims.

What is claimed is:

1. A three-dimensional, cuspated profile, turf reinforcement mat comprising trilobal, thermoplastic polymer, filament yarn
   wherein the trilobal, thermoplastic polymer, filament yarn includes a cross-sectional geometry having a substantially circular core region and three substantially convex elongated lobes that are substantially equally spaced around the core region, each elongated lobe consisting of a single, substantially symmetrical half-ellipse shaped convex member disposed along a portion of the circumference of the core region, a shortest distance between a geometrical apex of the convex member and the portion of the circumference of the core region being substantially equal to a longest width of the convex member along a geometrical axis perpendicular to a geometrical axis defined by the shortest distance between the apex and the portion of the circumference of the core region, and three substantially concave and smoothly curved channels separating the elongated lobes, a portion of each smoothly curved channel comprising a plurality of points along the circumference of the core region wherein the trilobal, thermoplastic polymer, filament yarn is woven to form a generally planar mat wherein the generally planar mat is subject to heat of a temperature and duration sufficient to accentuate a three-dimensional, cuspated profile.

2. The turf reinforcement mat according to claim 1 comprising a thickness in the range of about 0.25 inches (250 mils) to about 0.5 inches (500 mils).

3. The turf reinforcement mat according to claim 1 comprising a tensile strength of at least about 1800 pounds/foot in the warp direction and at least about 1800 pounds/foot in the filling direction.

4. The turf reinforcement mat according to claim 1 comprising a modulus at 10% elongation of at least about 9,000 pounds/foot in the warp direction and at least about 9,000 pounds/foot in the filling direction.

5. The turf reinforcement mat according to claim 1 wherein the denier of said yarn ranges from about 1200 to about 2000.

6. The turf reinforcement mat according to claim 1 wherein the thermoplastic polymer filament yarn comprises a polymer selected from the group consisting of polyethylene, polypropylene, polyester, polyphenylene oxide, fluoropolymers and mixtures thereof.

7. A method of stabilizing soil and reinforcing vegetation in a section of ground comprising:
   a) placing a three-dimensional, cuspated profile, woven turf reinforcement mat on the section of ground
      wherein the turf reinforcement mat includes heat-shrinkable trilobal filament yarns interwoven in substantially perpendicular direction to each other, each of the trilobal filament yarns having heat shrinkage characteristics such that, upon heating, the turf reinforcement mat includes a three-dimensional, cuspated profile, and wherein each of the trilobal filament yarns has a denier of between about 1200 and about 2000 and a cross-sectional geometry consisting essentially of:
      a substantially circular, substantially uniform core region,
      three substantially convex and smoothly curved elongated lobes substantially equally spaced about a circumference of the core region, each elongated lobe consisting of a single, substantially symmetrical half-ellipse shaped convex member disposed along a portion of the circumference of the core region, a shortest distance between a geometrical apex of the convex member and the portion of the circumference of the core region being substantially equal to a longest width Of the convex member along a geometrical axis perpendicular to a geometrical axis defined by the shortest distance between the apex and the portion of the circumference of the core region, and
      three substantially concave and smoothly curved channels separating the elongated lobes, a portion of each smoothly curved channel comprising a plurality of points along the circumference of the core region, each smoothly curved channel being configured to capture sediment to prevent erosion;
   (b) securing the turf reinforcement mat to the section of the ground; and
   (c) distributing soil or seed or mixtures thereof onto the turf reinforcement mat such that the section of ground has stabilized soil and upon seed germination, reinforced vegetation.

8. The method according to claim 7, wherein said turf reinforcement mat has a thickness in the range of about 0.25 inches (250 mils) to about 0.5 inches (500 mils).

9. The method according to claim 7, wherein said turf reinforcement mat has a tensile strength of at least about 1800 pounds/foot in the warp direction and at least about 1800 pounds/foot in the filling direction.

10. The method according to claim 7, wherein said turf reinforcement mat has a Modulus at 10% elongation of at least about 9,000 pounds/foot in the warp direction and at least about 9,000 pounds/foot in the filling direction.

11. The method according to claim 7, wherein the deniers of said yarn is in the range of about 1300 to about 2000.

12. The method according to claim 7, wherein the use of said turf reinforcement mat provides an increase of least about 50% in seed germination per area than pyramidal turf reinforcement mats of round monofilament yarns.

13. The method according to claim 7, wherein the use of said turf reinforcement mat provides an increase of about 30% to about 50% in average plant height compared to plant height using conventional pyramidal turf reinforcement mats of round monofilaments.

14. The method according to claim 7, wherein the use of said turf reinforcement mat provides an increase of from about 350% to about 760% in plant mass area as compared to plant mass area using pyramidal turf reinforcement mats of round monofilaments.

15. The method according to claim 7, wherein a radius of curvature of each of the channels substantially corresponds to a radius of curvature of each of the lobes.

16. The method according to claim 7 further comprising clearing, grading and compacting the section of ground prior to placement of the mat so that the mat has direct contact with the section of ground.

17. A method of manufacturing a turf reinforcement mat comprising:
   (a) weaving a drawn, trilobal, thermoplastic polymer, filament yarn to produce a woven mat having a three-dimensional cuspated profile;
   (b) heating the woven mat to accentuate the cuspated profile.

18. The method of claim 17 wherein the drawn, trilobal, thermoplastic polymer, filament yarn includes a cross-sectional geometry having a substantially circular core region and three substantially convex elongated lobes that are substantially equally spaced around the core region, each elongated lobe consisting of a single, substantially symmetrical half-ellipse shaped convex member disposed along a portion of the circumference of the core region, a shortest distance between a geometrical apex of the convex member and the portion of the circumference of the core region being substantially equal to a longest width of the convex member along a geometrical axis perpendicular to a geometrical axis defined by the shortest distance between the apex and the portion of the circumference of the core region, and three substantially concave and smoothly curved channels separating the elongated lobes, a portion of each smoothly curved channel comprising a plurality of points along the circumference of the core region.

19. The turf reinforcement mat according to claim 17 comprising a thickness of from about 0.25 inches (250 mils) to about 0.5 inches (500 mils).

20. The turf reinforcement mat according to claim 17 comprising a tensile strength in the warp direction of at least about 1800 pounds/foot and at least about 1800 pounds/foot in the filling direction.

21. The turf reinforcement mat according to claim 17 comprising a modulus at 10% elongation of at least about 9,000 pounds/foot in the warp direction and at least about 9,000 pounds/foot in the filling direction.

22. The turf reinforcement mat according to claim 17, wherein the denier of said yarn ranges from about 1200 to about 2000.

23. The turf reinforcement mat according to claim 17, wherein the yarn comprises a polymer selected from the group consisting of polyethylene, polypropylene, polyester, polyphenylene oxide, fluoropolymers, and mixtures thereof.

24. A three-dimensional, cuspated profile, turf reinforcement mat comprising trilobal, thermoplastic polymer, filament yarn
    wherein the trilobal, thermoplastic polymer, filament yarn includes a cross-sectional geometry having a substantially circular core region and three substantially convex elongated lobes that are substantially equally spaced around the core region, each elongated lobe consisting of a single, substantially symmetrical half-ellipse shaped convex member disposed along a portion of the circumference of the core region, a shortest distance between a geometrical apex of the convex member and the portion of the circumference of the core region being substantially equal to a longest width of the convex member along a geometrical axis perpendicular to a geometrical axis defined by the shortest distance between the apex and the portion of the circumference of the core region, and three substantially concave and smoothly curved channels separating the elongated lobes, a portion of each smoothly curved channel comprising a plurality of points along the circumference of the core region
    wherein the trilobal, thermoplastic polymer, filament yarn is woven to form a mat including a three-dimensional, cuspated profile.

25. A three-dimensional, cuspated profile, turf reinforcement mat having moisture retention abilities comprising a drawn, trilobal, thermoplastic polymer, filament yarn
    wherein the drawn, trilobal, thermoplastic polymer, filament yarn includes a cross-sectional geometry having a core region and three substantially curved lobes and three channels,
    wherein the drawn, trilobal, thermoplastic polymer, filament yarn is woven to form a mat including a three-dimensional, cuspated profile.

26. A three-dimensional, cuspated profile, turf reinforcement mat comprising trilobal, thermoplastic polymer, filament yarn
    wherein the trilobal, thermoplastic polymer, filament yarn includes a cross-sectional geometry having a core region and three nonsymmetrical lobes and three channels,
    wherein the trilobal, thermoplastic polymer, filament yarn is woven to form a mat including a three-dimensional, cuspated profile.

27. A three-dimensional, cuspated profile, turf reinforcement mat comprising trilobal, thermoplastic polymer, filament yarn
    wherein the trilobal, thermoplastic polymer, filament yarn includes a cross-sectional geometry having a core region and three nonuniform lobes and three nonuniform channels,
    wherein the trilobal, thermoplastic polymer, filament yarn is woven to form a mat including a three-dimensional, cuspated profile.

28. The method of claim 17 wherein the trilobal, thermoplastic polymer, filament yarn includes a cross-sectional geometry having a core region and three non-uniform lobes and three nonuniform channels.

29. The method of claim 17 wherein the trilobal, thermoplastic polymer, filament yarn includes a cross-sectional geometry having a core region and three nonsymmetrical lobes and three channels.

* * * * *